United States Patent [19]
Murray et al.

[11] 3,712,579
[45] Jan. 23, 1973

[54] SOLENOID VALVE PLUNGER

[75] Inventors: Myles N. Murray, Chagrin Falls; Dale M. Beaver, Mayfield Heights, both of Ohio

[73] Assignee: Industrial Electronic Rubber Company, Twinsburg, Ohio

[22] Filed: Aug. 24, 1970

[21] Appl. No.: 66,208

[52] U.S. Cl..................................251/38, 251/30
[51] Int. Cl......................F16k 31/385, F16k 31/40
[58] Field of Search........251/30, 141, 139, 129, 368, 251/38

[56] References Cited
UNITED STATES PATENTS 3,208,716  9/1965  Rolfe.................................251/38 X
2,888,233  5/1959  Windsor.................................251/30
3,531,086  9/1970  Shannon..................................251/356
3,082,359  3/1963  Mangiafico et al................251/141 X
3,111,271  11/1963  Lofgren............................251/368 X

*Primary Examiner*—Arnold Rosenthal
*Attorney*—Oberlin, Maky, Donnelly & Renner

[57] ABSTRACT

The plunger has a molded-on rubber body of right cylindrical exterior shape for coaction with a relatively rigid diaphragm orifice. The molding is done in a mold which crimps the end of the plunger to seal the cavity, with injection of the rubber to the same.

1 Claim, 4 Drawing Figures

PATENTED JAN 23 1973
3,712,579
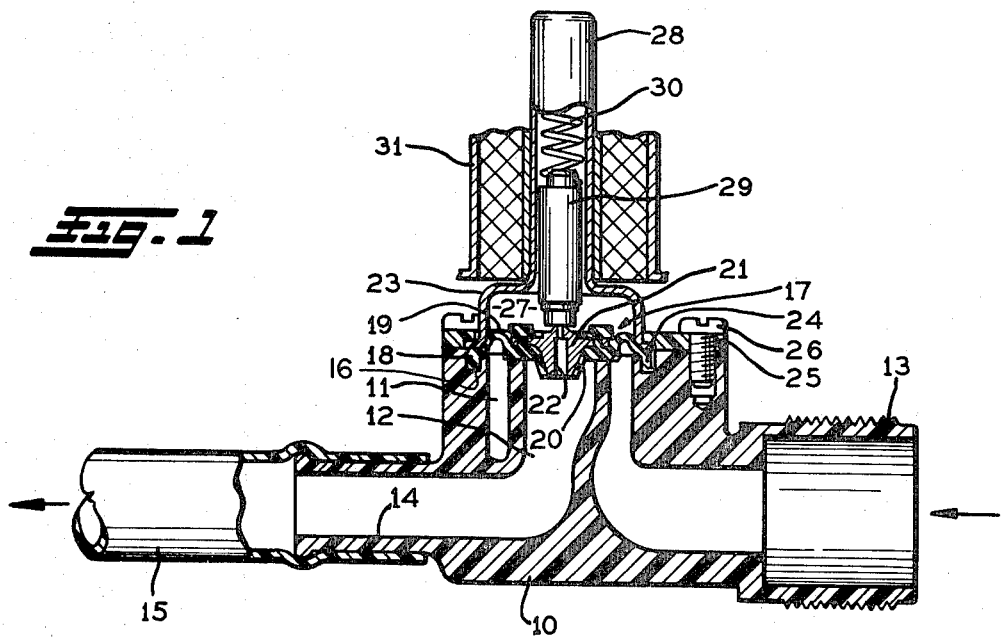
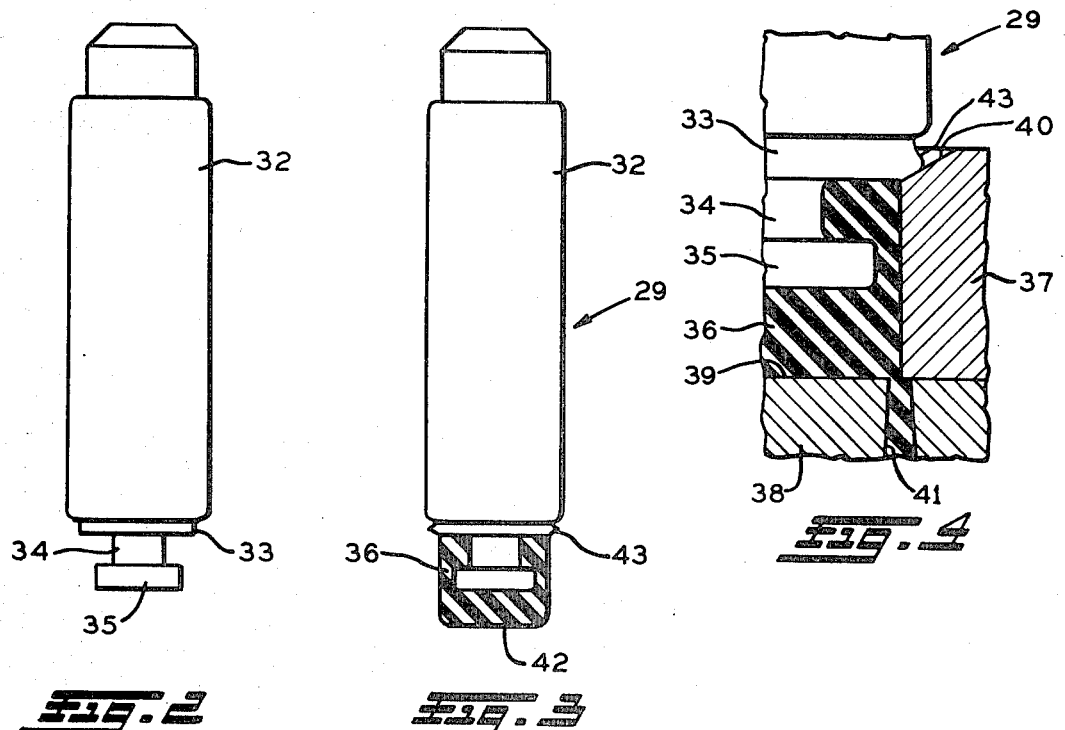
INVENTORS.
MYLES N. MURRAY
DALE M. BEAVER
BY
Oberlin, Maky, Donnelly & Renner
ATTORNEYS

SOLENOID VALVE PLUNGER

This invention relates to plungers of the type used in solenoid actuated diaphragm valves, for example, as shown in U.S. Pat. No. 3,544,062, dated Dec. 1, 1970.

The patent discloses a plunger in the form of a magnetic armature having a pointed lower end in the normal vertical orientation of such a valve, and this end controls the opening and closing of an axial passage in a flexible diaphragm bridging the valve inlet and outlet. The operation of this type of valve, which will be more fully explained in the following, involves having the point of the plunger normally engaged in and closing the diaphragm passage, with electromagnetic lifting of the plunger to clear the passage for through flow of the liquid when the valve is to open. It will be sufficient here to note that the coaction between the metal plunger point or conical tip and the diaphragm passage has, although traditional, not been fully reliable over long periods of use due to the low tolerance that this type of sealing interface has for dirt particles and the like and also as a result of wear of the flexible material against which the tip is seated.

It has been proposed to employ a different seating configuration to improve the tolerance for dirt, and the plunger of the present invention is on this order in that its end carries a resilient sealing body having a substantially flat face for coaction with a raised and relatively rigid end of the axial passage in the diaphragm.

There must be a very good mechanical joining of the resilient body, of rubber or the equivalent, and the end of the metal plunger, and it is preferred according to this invention to accomplish this by molding the body on the plunger end. It is another object of this invention to provide an improved method of producing this plunger with its such molded active end.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a vertical section of a diaphragm valve including a plunger in accordance with the present invention;

FIG. 2 is an enlarged elevation of the metal body of such plunger;

FIG. 3 is a similar elevation of the plunger in finished form with a molded-on resilient body at the active end; and FIG. 4 is a further enlarged and simplified section of a mold applied to the forming of the resilient body on the end of the plunger.

Referring now to the drawings in detail, the complete valve assembly, which is of the type used for example for water control in a domestic clothes washing machine, includes a molded plastic body 10 having an annular inlet 11 in concentric spaced relation about an axial outlet 12. At one side, the body is formed with an externally threaded fitting 13 which communicates with the inlet and is adapted to be connected to the water supply line, and a nipple 14 is formed at the other side of the body in communication with the central outlet to receive a delivery hose 15. The top of the outlet is slightly below the plane of the top of the body as shown and the latter is formed with an annular groove 16.

A flexible diaphragm 17 having a main body part of rubber, or a plastic with good flex life such as polypropylene, is disposed over the inlet and outlet to control communication between the two for flow of the water or other liquid through the valve. This diaphragm has an outer vertical flange 18 which is seated in the top body groove 16, an intermediate upwardly folded section 19, and a relatively thickened central part 20 which seats on and partially extends into the axial outlet 12. The fold is thus over the annular inlet 11, and it will be understood that the diaphragm rolls or unfolds upwardly away from the outlet when the liquid flow is desired.

The central part of the diaphragm includes an insert 21 which is made of a relatively rigid material, for example, filled nylon, with the flexible rubber or the like molded about and incorporating the same, and the axial flow passage 22 of the diaphragm is located in this insert. Such insert is formed with a projection at the top about the upper end of the passage 22 and a small diameter bleed hole, not shown, will be provided at a part of the diaphragm which is over the inlet 11. This arrangement of central or axial passage and bleed hole in the diaphragm is common, and it is significant only to note particularly that the part of the diaphragm here containing the passage 22 for coaction with the plunger is relatively rigid and presents at the upper end an annular flat surface about the passage.

A bell form cap 23 of non-magnetic metal is placed over the diaphragm with a bottom flange 24 overlying the outer edge of the diaphragm, and both are clamped to the valve body 10 by an overlapping retainer ring 25 fastened to the body by screws 26. The lower portion of the cap forms cooperably with the diaphragm a chamber 27 which is, through the previously mentioned bleed hole, in continuous communication with the inlet 11, while the hollow stem part 28 of the cap is aligned with the axial diaphragm passage 22 and contains the plunger 29 and a light bias spring 30 above the same. The normal orientation of the valve is vertical, and a lifting solenoid 31 is mounted on the stem 28 to draw plunger 29 upwardly against the spring when energized, thereby to open the diaphragm passage as will more fully appear below.

The plunger comprises a metal body 32, preferably made of stainless steel, of the shape shown in FIG. 2 and thus having at its lower operating end a first integral extension 33 of slightly reduced outside diameter, a second axial extension or neck 34 of appreciably reduced diameter, and a terminal disc form 35 the outside diameter of which is greater than that of the neck but smaller than that of the first extension. This metal body is provided with a molded-on body 36 of rubber or equivalent resilient material of essentially right cylindrical shape in exterior configuration.

The application of the resilient body to the metal body is accomplished by molding in end defining mold pieces 37, 38 according to the section shown in FIG. 4. It will be seen from this last figure that such mold assembly defines a closed end right cylindrical cavity 39 for the rubber and has a flared or conical top surface 40 which engages the corner of the metal body 33 and crimps or deforms the same outwardly in the closing of the mold to positively seal the cavity against flash. The rubber is injected into the cavity from one or more passages 41 at the inner corner, or from a full gate about the same, if desired, so that there is no sprue residue or marking at the end face 42 of the body which serves as the working or sealing area of the plunger. No separate finishing operation for such face after molding is therefore required.

The molding is also carried out so that the increase in the external diameter at the crimped corner 43 is less than the outside diameter of the main body of the plunger to preclude any possible interference in sliding of the plunger within the hollow stem of the valve cap. This relationship is assured by proper dimensioning of the reduction in diameter between the main body and the first extension 33 and the expected degree of growth in the latter in the closing of the mold.

It will be appreciated that the rubber in fully enclosing the neck and relatively enlarged disc head is firmly locked mechanically on the plunger end. The engagement is moreover watertight, so that there is no danger of water getting behind the resilient rubber and acting under pressure to force separation of the same from the plunger end.

The operation of the valve is, as indicated earlier, conventional and entails normal positioning of the plunger as shown in FIG. 1 with the rubber body 36 sealing the central diaphragm passage 22. Water fills the bell cap at the outside of the diaphragm by virtue of the bleed hole connection of the same to the inlet, whereby the diaphragm is maintained in the outlet closing condition. The solenoid is energized to open the valve, causing the plunger to be raised sufficiently to unblock passage 22. The diameter of the latter is substantially greater than that of the bleed hole, so that there is a discharge of the water from within the cap to the outlet at a rate considerably higher than the inflow through the bleed hole to create a pressure differential across the diaphragm which moves it upwardly away from the outlet. With de-energization of the solenoid, the plunger drops to block the passage 22, and the water pressure within the cap increases to move and hold the diaphragm against the outlet.

Such operation does of course require reliable coaction between the plunger and the main diaphragm passage, and it will now be obvious that the new plunger provides an appreciably increased area for sealing in a substantially flat interface configuration. The operation is therefore less susceptible to impairment by dirt and the like and to wear over long periods of use.

We, therefore, particularly point out and distinctly claim as our invention:

1. In a valve assembly, a diaphragm having a flexible main body part and a relatively rigid central part in which a fluid flow passage is provided, and a plunger engageable with said diaphragm over said passage for opening and closing the latter when moved axially relative thereto, said plunger being elongated and having a head formed at the end thereof which engages the central part of the diaphragm, the plunger head having a flat outer face in perpendicular relation to the plunger axis, and a body of resilient sealing material molded about and behind said head for the engagement with and disengagement from the central diaphragm part to control the passage therein, the outer diaphragm-engaging face of such molded resilient body also being flat and perpendicular to the plunger axis, and the resilient body being of right cylindrical exterior shape and reduced cross-section compared to the major extent of the plunger.

* * * * *